US012638539B2

(12) United States Patent
Lehavi

(10) Patent No.: US 12,638,539 B2
(45) Date of Patent: May 26, 2026

(54) INDOOR REAL-TIME LOCATION SYSTEM (RTLS) AND METHOD OF OPERATING THEREOF

(71) Applicant: QLOG TECHNOLOGIES LTD, Zichon Yaakov (IL)

(72) Inventor: Amit Lehavi, Zichron Yaakov (IL)

(73) Assignee: QLOG TECHNOLOGIES LTD, Zichon Yaakov (IL)

( * ) Notice: Subject to any disclaimer, the term of this patent is extended or adjusted under 35 U.S.C. 154(b) by 472 days.

(21) Appl. No.: 18/044,765

(22) PCT Filed: Sep. 9, 2021

(86) PCT No.: PCT/IL2021/051096
§ 371 (c)(1),
(2) Date: Mar. 9, 2023

(87) PCT Pub. No.: WO2022/054055
PCT Pub. Date: Mar. 17, 2022

(65) Prior Publication Data
US 2023/0333199 A1      Oct. 19, 2023

Related U.S. Application Data

(60) Provisional application No. 63/076,456, filed on Sep. 10, 2020.

(51) Int. Cl.
*G01S 5/02* (2010.01)
*G01S 5/00* (2006.01)

(52) U.S. Cl.
CPC ........ *G01S 5/02524* (2020.05); *G01S 5/0036* (2013.01); *G01S 5/02521* (2020.05)

(58) Field of Classification Search
CPC ........ G01S 5/0252–02529; G01S 5/14; H04W 4/80
See application file for complete search history.

(56) References Cited

U.S. PATENT DOCUMENTS 6,466,938 B1 * 10/2002 Goldberg ............ G01S 5/02526
707/999.1
9,338,592 B1 * 5/2016 Mahapatra .......... G01S 5/02525
(Continued)

FOREIGN PATENT DOCUMENTS

WO      2005062066 A2      7/2005
WO      2017142995 A1      8/2017

OTHER PUBLICATIONS

International Search Report and Written Opinion dated Nov. 17, 2021 for corresponding International Application No. PCT/IL2021/051096.

*Primary Examiner* — Cassi J Galt
(74) *Attorney, Agent, or Firm* — Tarolli, Sundheim, Covell & Tummino LLP

(57) ABSTRACT

There is provided a technique of operating a real-time locating system (RTLS) in an indoor environment. The technique comprises: obtaining from a UD a timestamped dataset informative of ID of a tagged object registered by the UD in its proximity, of ID of the UD and of ambiguous sample electromagnetic pattern (SEP) registered by the UD; and defining a location of the tagged object at a point-in-time in accordance with the location of the UD, the point-in-time corresponding to a timestamp of the dataset. The location of the UD is defined using a SEP map informative of associations, at point-in-time, between the SEPs and locations thereof. The SEP map is continuously generated by processing timestamped "UD reports" continuously received from a plurality of UDs, each "UD report" comprising data informative of a respectively registered SEP and a unique identification of a reported UD (IDUD).

17 Claims, 11 Drawing Sheets

(56)　　　　　　　References Cited

U.S. PATENT DOCUMENTS

| | | | |
|---|---|---|---|
| 2008/0042898 A1* | 2/2008 | Sharma | G01S 5/14 |
| | | | 342/450 |
| 2012/0268250 A1* | 10/2012 | Kaufman | H04W 4/80 |
| | | | 340/10.1 |
| 2015/0080014 A1 | 3/2015 | Ben-Yosef | |
| 2015/0309180 A1 | 10/2015 | Jiang | |
| 2016/0044467 A1 | 2/2016 | Clausen | |
| 2017/0245115 A1 | 8/2017 | Lei | |
| 2017/0372223 A1 | 12/2017 | Vaughn | |
| 2018/0025500 A1* | 1/2018 | Nielsen | G06V 20/52 |
| | | | 382/103 |
| 2018/0091953 A1 | 3/2018 | Nagpal | |
| 2018/0120410 A1* | 5/2018 | Ivanov | G01S 5/02524 |
| 2018/0253679 A1* | 9/2018 | Chritz | G06Q 10/087 |
| 2018/0302766 A1 | 10/2018 | Dizengof | |
| 2020/0089233 A1* | 3/2020 | Kurk | G05D 1/0022 |

\* cited by examiner

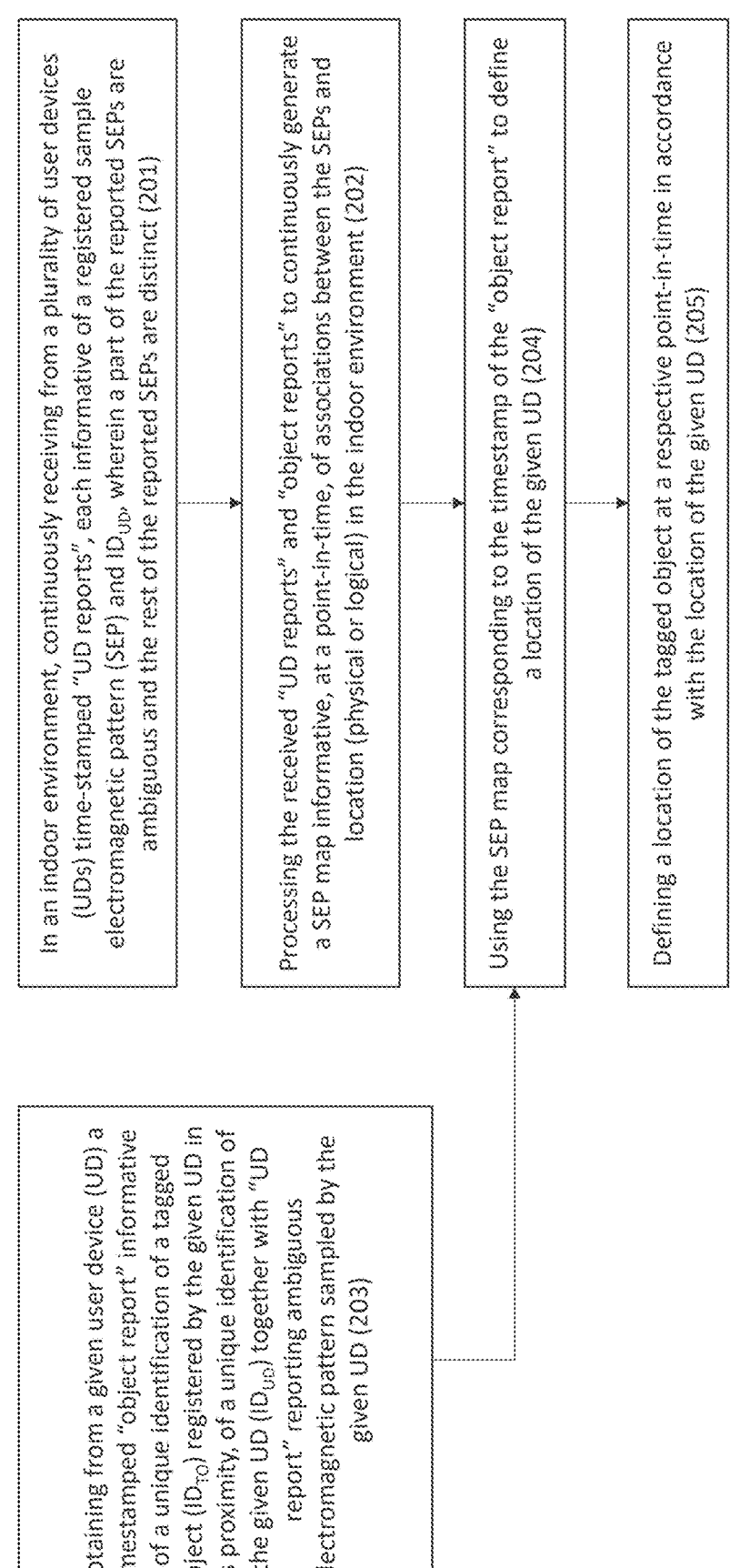

In an indoor environment, continuously receiving from a plurality of user devices (UDs) time-stamped "UD reports", each informative of a registered sample electromagnetic pattern (SEP) and $ID_{UD}$, wherein a part of the reported SEPs are ambiguous and the rest of the reported SEPs are distinct (201)

Processing the received "UD reports" and "object reports" to continuously generate a SEP map informative, at a point-in-time, of associations between the SEPs and location (physical or logical) in the indoor environment (202)

Obtaining from a given user device (UD) a timestamped "object report" informative of a unique identification of a tagged object ($ID_{TO}$) registered by the given UD in its proximity, of a unique identification of the given UD ($ID_{UD}$) together with "UD report" reporting ambiguous electromagnetic pattern sampled by the given UD (203)

Using the SEP map corresponding to the timestamp of the "object report" to define a location of the given UD (204)

Defining a location of the tagged object at a respective point-in-time in accordance with the location of the given UD (205)

FIG. 2

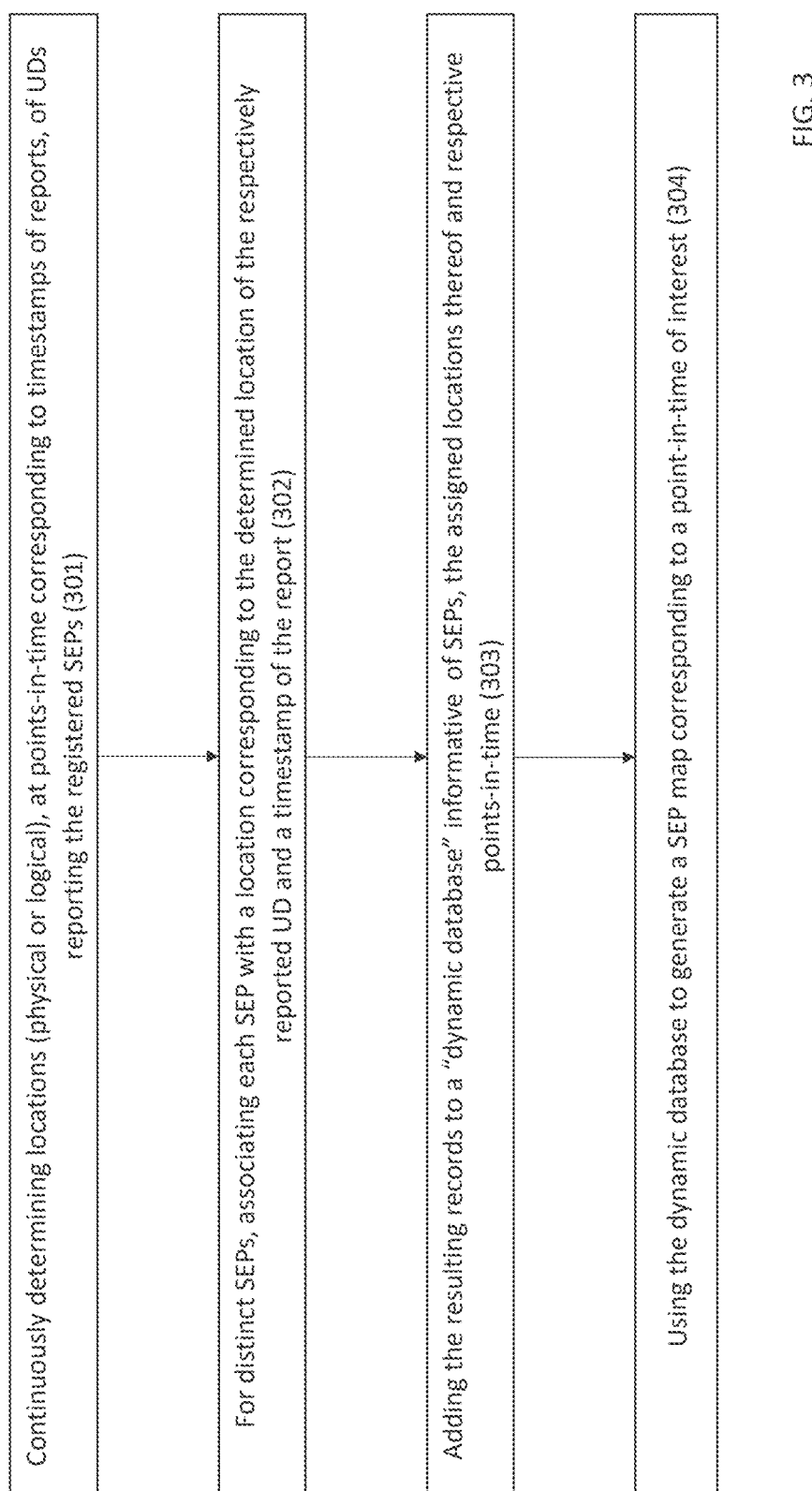

Continuously determining locations (physical or logical), at points-in-time corresponding to timestamps of reports, of UDs reporting the registered SEPs (301)

For distinct SEPs, associating each SEP with a location corresponding to the determined location of the respectively reported UD and a timestamp of the report (302)

Adding the resulting records to a "dynamic database" informative of SEPs, the assigned locations thereof and respective points-in-time (303)

Using the dynamic database to generate a SEP map corresponding to a point-in-time of interest (304)

FIG. 3

Wifi Access Point 1

Wifi Access Point 2

BLE tag A

BLE tag B

Channel 1

Channel 2

Channel 3

Channel 4

Channel 5

Channel 6

Channel N

INDOOR REAL-TIME LOCATION SYSTEM (RTLS) AND METHOD OF OPERATING THEREOF

RELATED APPLICATIONS

The present application is a U.S. National Stage application under 35 USC 371 of PCT Application Serial No. PCT/IL2021/051096, filed on 9 Sep. 2021, which claims priority from U.S. Provisional Application Ser. No. 63/076, 456, filed on 10 Sep. 2020, the entirety of each of which is incorporated herein by reference.

TECHNICAL FIELD

The presently disclosed subject matter relates to location techniques and, more particularly, to a real-time indoor location systems and methods.

BACKGROUND

Real-time location systems (RTLS), also referred to as asset-tracking or equipment tracking is a term describing techniques to continuously or intermittently determine the geographic or logic location of objects/articles (e.g., medical equipment or any other equipment) in real-time usually within a building or other indoor environment. RTLS systems offer functionality to multiple industries, and enable, Asset Tracking and/or Inventory management etc. RTLS systems are based on identification of tracked objects, most commonly by electronic equipment tags or badges attached to objects providing ability to actively or passively broadcast their location to an information system. The equipment tags operate in different wireless standards/protocols such as radio frequency, Wi-Fi, Infrared, Bluetooth Low Energy, Low Frequency, ultrasound and others.

Most RTLS, make use of transmitters and/or receivers, spaced throughout the indoor environment at fixed reference points. By receiving wireless signals from the tags and by utilizing a unique ID thereof the system can locate the tags and provide real-time information about its positioning within the indoor environment and thus the location of the objects carrying the tags can be determined. In most cases, the more RTLS reference points that are installed, the better the location accuracy.

Problems of determining indoor location have been recognized in the conventional art and various techniques have been developed to provide solutions, for example:

US Patent Application No. 2015/0309180 discloses a method for determining a geo coordinate for an indoor location. The method information of multiple anchor points is received and stored. The information of each anchor point includes Global Positioning System (GPS) data of a particular location and radio frequency (RF) data that was obtained at a device at the particular location. A geo coordinate is determined for an indoor location based on the RF data obtained at the indoor location and the information of the anchor points. Various embodiments pertain to software, systems, devices and methods relating to anchor points and/or the obtaining of a geo coordinate for a location.

US Patent Application No. 2016/044467 discloses a method of communicating indoor location information. A user may manually indicate his or her location using a first IPS-enabled device and share the location with a second device. The first IPS-enabled device may communicate to an IPS backend the user-specified location and information about beacons and their respective signal strengths detected by the first IPS-enabled device at the time that the user indicated his or her location. The IPS backed may forward the location information to a second device, which may or may not be IPS-enabled. The IPS backend may also use the user-specified location and the beacon information received from the first IPS-enabled device to update and maintain a global beacon database to ensure that the global database remains up-to-date for future indoor positioning operations.

US Patent Application No. 2018/091953 discloses method and system for deploying a calibrated positioning map of an area. The method comprises receiving, at a memory of the server computing device, a first set of fingerprint data acquired within the area by a plurality of mobile devices, generating, using the processor, a distribution of calibrated data points based at least in part on the first set of fingerprint data, the calibrated data points representing respective positions within the area, receiving, at the memory, a second set of fingerprint data acquired by at least one additional mobile device, processing, using the processor, the second set of fingerprint data and the calibrated data points to generate an updated distribution of calibrated data points, and when the updated distribution exceeds a predetermined threshold density of calibration data points, deploying the updated distribution as the calibrated positioning map of the area.

US Patent Application No. 2017/372223 discloses a method for facilitating crowd-sourced automatic indoor discovery and mapping. The method includes collecting data relating to a facility, where the data is based on one or more of movement data, contextual data, and observation data relating to at least one of an indoor space and one or more users of the indoor space. The method may further include generating one or more dynamic profiles of the indoor space and the occupants, and building a map of the indoor space based on the one or more dynamic profiles.

The references cited above teach background information that may be applicable to the presently disclosed subject matter. Therefore the full contents of these publications are incorporated by reference herein where appropriate for appropriate teachings of additional or alternative details, features and/or technical background.

General Description

In accordance with certain aspects of the presently disclosed subject matter, there is provided a method of operating a computerized real-time locating system (RTLS) to locate an object in an indoor environment. the method includes obtaining from a given user device (UD) a first timestamped dataset informative of a unique identification of a given tagged object registered by the given UD in its proximity, of a unique identification of the given UD and of ambiguous sample electromagnetic pattern (SEP) registered by the given UD and defining a location of the given tagged object at a point-in-time in accordance with the location of the given UD, the point-in-time corresponding to a time-stamp of the first dataset, wherein the location of the given UD is defined using a mapping data structure informative of associations, at the point-in-time, between the SEPs and locations thereof in the indoor environment, and wherein the mapping data structure is continuously generated by processing timestamped "UD reports" continuously received from a first plurality of UDs, each "UD report" comprising second dataset informative of a respectively registered SEP and a unique identification of a reported UD (DUD), wherein a part of the reported SEPs are ambiguous and the rest of the reported SEPs are distinct.

In certain embodiments, a "UD report" can be informative of one or more stationary emitters having known locations and transmission patterns and contributed to a reported distinct SEP and the method further includes deriving a UD location from the known emitters' locations and using the derived UD location when generating the mapping data structure.

In certain embodiments, the method can further include using the DUD from a "UD report" and the report's timestamp to obtain a location of the reported UD from an external database informative of an association of the reported UD and its location at a respective point-in-time and using the obtained UD location when generating the mapping data structure.

In certain embodiments, the external database can be database of a logistics system configured to store timestamped "event reports", each report including data informative of ID of the reporting UD in association with the reported location-indicative code, and at least part of UDs can send the "event reports" belong to the first plurality of UDs.

In certain embodiments, the method can further include searching the mapping data structure to find substantially the same SEP with a known location upon receiving the first timestamped dataset informative of an ambiguous SEP; defining the location of the ambiguous SEP as corresponding to the known location; and defining the location of UD reported the ambiguous SEP as corresponding to location of UD reported the substantially the same SEP with the known location.

In certain embodiments, the method can also include continuously maintaining a database comprising a plurality of mapping data structures, each associated with a point-in-time of its generation; storing at least part of the received first timestamped datasets; upon defining one or more points-in-time of interest, selecting one or more mapping data structures and one or more timestamped first datasets corresponding to the defined points-in-time of interest; and using the selected one or more mapping data structures and one or more timestamped first datasets to define the object location at the defined points-in-time, thereby enabling tracking back and/or forth the location of the tagged object.

In certain embodiments, the method can also include continuously determining locations of UDs from the first plurality of UDs; continuously associating the determined locations of the UDs with respectively reported SEPs and timestamps of the respective reports to yield a plurality of SEP data structures informative of SEP locations at respective points-in-time; continuously adding the SEP data structures to a database configured to maintain data informative of SEPS and association, at a respective point-in-time, between the SEPs and their locations in the indoor environment; and using the database to generate one or more mapping data structures corresponding to one or more points-in-time of interest.

In accordance with other aspects of the presently disclosed subject matter, there is provided a computer-based real-time locating system (RTLS) configured to locate an object in an indoor environment, the system further configured to operate in accordance with the all the method stages described above.

In accordance with further aspects of the presently disclosed subject matter, there is provided a computer program product implemented on a non-transitory computer usable medium and comprising computer readable program code for performing all the method stages described above.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2 illustrates a generalized flow chart of RTLS operating in accordance with certain embodiments of the presently disclosed subject matter;

FIG. 3 illustrates a generalized flow chart of a dynamic map generation process in accordance with certain embodiments of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, RTLS and processing and memory (PMC) circuitry therein and the user devices disclosed in the present application.

The terms "non-transitory memory" and "non-transitory storage medium" used herein should be expansively construed to cover any volatile or non-volatile computer memory suitable to the presently disclosed subject matter.

The term "signal" used herein excludes transitory propagating signals but includes any other signal suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
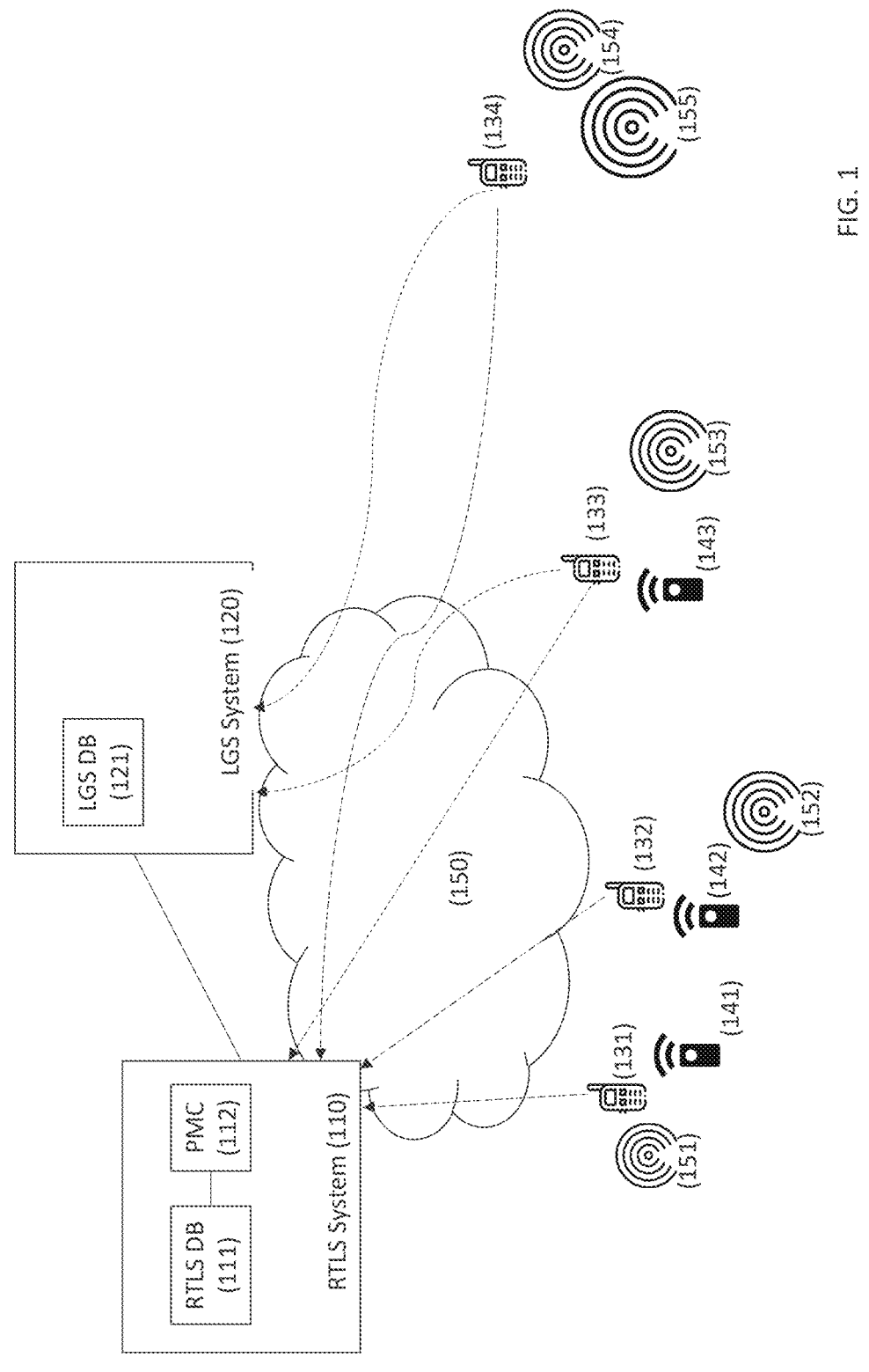
FIG. 1 illustrates a generalized setting comprising an RTLS configured in accordance with certain embodiments of the presently disclosed subject matter.

Bearing this in mind, attention is drawn to FIG. 1 illustrating a generalized setting comprising an RTLS configured in accordance with certain embodiments of the presently disclosed subject matter. RTLS 110 is configured to locate one or more objects within an indoor environment it's associated therewith. By way of non-limiting example, the indoor environment may be a medical facility, a mall, an airport, an office building, a hotel, etc. A location in the indoor environment can be characterized by geographical coordinates and/or by logical coordinates (e.g., room number, floor, building, etc.). The buildings, rooms, floors and/or the equipment in the indoor environment can have logic identification tags such as a quick response (QR) tags or other identification means informative of their geographical and/or physical coordinates.

RTLS 110 is configured to communicate with a plurality of user devices (UDs) 131-134 via a communication network 150 (e.g., Internet). As will be further detailed with reference to FIG. 2, RTLS 110 is configured to locate the objects with the help of data that it receives from the UDs. The illustrated real-time location system 110 includes a database 111 operatively connected to a processing and memory circuitry (PMC) 112 configured to enable all processing necessary for operating RTLS in accordance with certain embodiments of the presently disclosed subject matter. PMC 112 comprises a processor and a memory (not shown separately within the PMC).

The term "user device" should be expansively construed to cover any kind of hardware-based electronic device with data processing and communication capabilities The operations in accordance with the teachings herein may be performed by a user device specially constructed for the desired purposes or by a specially configured for the desired purpose general-purpose communication device (e.g., smartphone, smart glasses, a smartwatch, a computer tablet, etc.).

The indoor environment further comprises a plurality of objects (denoted as 141-143), each bearing a unique identification readable by a suitably configured UD device when being in a proximity of a respective object. Such identification ($ID_{TO}$) of an object can be enabled by an identification tag (referred to hereinafter also as "tag"), and the identifiable objects are referred to hereinafter also as "tagged objects". A tag can be attached to an object and/or embedded therein or be otherwise uniquely associated with the object and location thereof.

For purpose of the illustration only, the following description is provided for RFID tags. Those skilled in the art will readily appreciate that the teachings of the presently disclosed subject matter are, likewise, applicable to other types of identification tags (e.g., based on QR barcodes, NFC (near-field communication), etc.) readable by suitably configured UD devices in proximity of the respective objects.

Radio-frequency identification (RFID) uses electromagnetic fields to automatically identify RFID tags and, thereby, the associated objects. The RFID tags can be active or passive. Passive tags are powered by energy from the received interrogating radio waves, and active tags comprise their own power source.

User devices 131-134 can be configured to trigger RFID tags by issuing an electromagnetic interrogation pulse (e.g., infrared, Bluetooth, Wi-Fi, ultrawide band, etc.) and to receive data indicative of $ID_{TO}$ and transmitted by RFID tag in response to the interrogation. User devices 131-134 can be further configured to send to RTLS 110 time-stamped report comprising data indicative of $ID_{TO}$.

Further to the electromagnetic identification tags, the indoor environment comprises other types of radio-frequency emitters denoted as 151-155. Unless specifically stated otherwise, throughout the specification the term "emitter" should be expansively construed to cover any device having a unique identity and broadcasting an electromagnetic signal informative of its identity (e.g., RFID Tags, Wi-Fi Access Points, BLE Beacons, cellular base stations, etc.) and receivable by nearby UDs. The emitters can be fixed at a certain location or can change the locations, can appear and disappear.

Each location of the indoor environment can be characterised by existence or absence of electromagnetic pattern receivable by a UD at the location. An electromagnetic pattern associated with IDs of all emitters ($ID_{EM}$) contributing thereto is referred to hereinafter as a "sample electromagnetic pattern" (SEP). Further to the emitters' IDs, the SEP is informative of the strength/intensity of the signals receivable by a UD (e.g. a combination of Received Signal Strength Indicator (RSSI) from each of one or more emitters.

Some of the SEPs can be substantially constant while other SEPs can vary with time. For example, the SEPs can vary due to swapping, moving and/or changing the emitters contributing thereto. Likewise, the SEPs can vary due to interference with other dynamic variable sources of electromagnetic radiation (e.g. electric motor, ventilation fan, medical device, etc.).

User devices 131-134 can be configured to continuously receive the emitted electromagnetic signals from one or more emitters in the proximity thereof and thereby to register the respective SEPs. Coordinates (geographical or logical) of a registered SEP (referred to hereinafter also as a location of SEP) correspond to a location of the respective UD when registering the SEP.

User devices 131-134 can be further configured to continuously send to RTLS 110 time-stamped reports, each comprising data indicative of the registered SEP.

A given SEP can be reported as a distinct SEP or as an ambiguous SEP. A reported SEP is referred to hereinafter as a distinct SEP when the UD that has reported the SEP is locatable at the corresponding point-in-time. By way of non-limiting example, UD location can be obtained from an external source (e.g., GPS data, a data structure with time-stamped $ID_{UD}$-related location records, etc.) or derived from known location(s) and transmission patterns of the emitter(s) contributing to the given SEP.

In some cases, emitter(s) contributing to a SEP can have unknown location/transmitting pattern(s) at a certain point-in-time (e.g., can be swapped or moved from the previously known location), and a location of the reported UD, also, can be not obtainable from an external source available to RTLS. In such a case, the reported UD is referred to hereinafter as not locatable at this certain point-in-time, and the reported SEP is referred to hereinafter as an ambiguous SEP.

Unless specifically stated otherwise, it is appreciated that throughout the specification the terms "continuously receiving", "continuously reporting", "continuously generating" or the like refer to actions provided in accordance with a certain arrangement related to new data availability. For example, such actions can be provided in near real-time mode, responsive to predefined events, etc. It is noted that, unless specifically stated otherwise, the term "predefined events" should be expansively construed to cover also scheduled events and events occurring in accordance with predefined periodicity.

The setting illustrated in FIG. 1 further comprises a logistic system (LGS) 120. LGS 120 is configured to manage LGS tasks related to supply chain management, quality control procedures, procedure logging and tracking, maintenance procedure, etc. When fulfilling a routine task at a certain location, a user uses UD to scan QR code (or other suitable code) informative of geographical and/or logical coordinates of this certain location and to send the code to LGS 120, thereby reporting respective event (e.g. completion of the task). Such "event report" bears a timestamp and comprises data informative of ID of the reporting UD ($ID_{UD}$) in association with the reported location-indicative code.

LGS 120 is configured to continuously process the "event reports" received from a plurality of UDs to derive locations of the reporting UDs at the time of reporting. LGS 120 is further configured to store the derived timestamped locations in a database 121.

As illustrated, some of UDs (denoted as 131 and 132) are configured to report merely to RTLS 110, while other UDs (denoted as 133 and 134) are configured to report to both systems, i.e. to RTLS 110 and LGS 120.

In accordance with certain embodiments of the presently disclosed subject matter, RTLS 110 is configured to be in data communication with LGS 120 and use the respective $ID_{UD}$ to receive from LGS 120 data informative of location, at point-in-time, of UDs reported to the both system, the location known and stored at LGS.

It is noted that the teachings of the presently disclosed subject matter are not bound by the RTLS and LGS systems described with reference to FIG. 1. Equivalent and/or modified functionality can be consolidated or divided in another manner and can be implemented in any appropriate combination of software with firmware and/or hardware and executed on a suitable device. The RTLS and LGS systems can be standalone network entities, or can be integrated, fully or partly, with other systems. Optionally, at least part of the functionality of RTLS and/or LGS can be implemented in a cloud and/or distributed arrangement. The data repositories can be consolidated or divided in other manner; databases can be shared with other systems or be provided by other systems, including third party equipment.

It is further noted that events that occur at different moments but within real-time constrains of RTLS are referred to hereinafter as occurring at the same point-in-time.

Referring to FIG. 2, there is illustrated a generalized flow chart of RTLS operating in accordance with certain embodiments of the presently disclosed subject matter.

RTLS 110 continuously receives (201) time-stamped reports from the plurality of UDs, each report being informative of $ID_{UD}$ and SEP registered by the respective UD, wherein a part of the reported SEPs are ambiguous and the rest of the reported SEPs are distinct. The reports are referred to hereinafter as "UD reports". The UD reports can be stored in RTLS database 111.

RTLS further receives from UDs timestamped "object reports" comprising data indicative of unique identifications of the reporting UDs and unique identifications ($ID_{TO}$) of the respectively registered tagged objects. "Object report" can be sent together with "UD report" (e.g. as a combined report or two separate concurrent reports), wherein the respective object tag is one of one or more emitters contributing to the SEP reported in UD report.

RTLS 110 further processes the received "UD reports" to continuously generate (202) a dynamic SEP map informative, at a point-in-time, of associations between the SEPs and their locations (physical or logical) in the indoor environment.

RTLS 110 is configured to use data of UD report to define locations of the UDs reported distinct SEPs. For example, RTLS 110 can use the respective $ID_{UD}$ and the report's timestamp to obtain from the external database (e.g., LGS 120) a location of the UD at the respective point-in-time. Alternatively or additionally, RTLS 110 can derive the UD location from data informative of locations/transmission patterns of emitters contributed into the respectively reported SEP.

Coordinates of the distinct SEPs in the indoor environments correspond to locations of the respectively reported UDs. As will be further detailed with reference to FIG. 3, defined associations between the distinct SEPs and locations thereof are usable for generating the SEP map. Some of such locations are substantially static over time (e.g. SEPs corresponding to stationary emitters as, for example beacon(s) or Wi-Fi access point(s)), while other locations can vary with time.

It is noted that the same SEP can be reported by a first UD as a distinct SEP and, at the same point-in-time, can be reported by a second UD (e.g., non-locatable at the point-in-time by triangulation and from an external DB) as ambiguous. Thus, when RTLS 110 identifies the SEP reported by the second UD as substantially the same as reported by the first UD, RTLS 110 defines that both UDs are, at the respective point-in-time, in the proximity of SEP location. Likewise, RTLS 110 can use the generated SEP map for defining locations of reported ambiguous SEPs.

As was detailed with reference to FIG. 1, RTLS receives from a plurality of UDs timestamped reports (referred to hereinafter as "object reports") comprising data indicative of $ID_{TO}$ of the respectively registered tagged objects and unique identifications of the respective UDs (DUD). The received "object reports" can be stored in RTLS database 111.

When RTLS obtains (203) from a given UD a time-stamped "object report" together with a timestamped "UD report" reporting of ambiguous SEP registered by the given UD, RTLS uses the SEP map corresponding to the time-stamp of the "object report" to define a location of the reported ambiguous SEP and, accordingly, the location of the given UD (204). As will be further detailed with reference to FIGS. 4 and 5, the location of ambiguous SEP is defined as a location of substantially the same SEP presented at the SEP map, and the location of the given UD is defined as location of the respective previously localized UD.

It is noted that some of UDs can be configured to report to RTLS 110 only "UD reports", while other UDs can be configured to report to RTLS 110 both "UD reports" and "object reports". Some of the UDs reporting to RTLS 110 can be further configured to report "event reports" to LGS 120.

RTLS further defines a location of the tagged object at a respective point-in-time in accordance with the location of the given UD (205).

All above operations can be provided by respectively configured PMC 112.

Optionally, RTLS can store data informative of a plurality of SEP maps, each associated with different point-in-time of interest. Accordingly, RTLS can track back and forth location of a tagged object at different points-in-time. The tracking can comprise selecting SEP maps and "object reports" corresponding to several points-in-time of interest and using the selected SEP maps and the "object reports" to define the object locations at the respective points-in-time.

In certain embodiments of the presently disclosed subject matter, RTLS 110 can further process the received plurality of "UD reports" to find behavioural patterns, such as emitters that comes and go in a consistent time of arrival/disappearing pattern. Likewise, RTLS 110 can find anomalies, such as objects that are gone, and emitters that are no longer visible.

Referring now to FIG. 3 illustrating a generalized flow chart of a dynamic map generation process in accordance with certain embodiments of the presently disclosed subject matter. RTLS continuously determines (301) locations (physical or logical) of reporting user devices (UDs). For points-in-time corresponding to timestamps of reports, the location can be determined with the help of the time-stamped "UD reports" continuously received from the UDs and processed by the RTLS 110. For a certain UD, each time-stamped "UD report" carries information of the user device identifier (pub) and a SEP registered by the UD at respective point-in-time.

The registered SEPs are informative of the registered strength/intensity profile (referred to hereinafter also as RF profile) and IDs of emitters ($ID_{EM}$) contributing thereto, wherein at least a part of the emitters have known locations and transmitting patterns. Thus, the location of a certain UD can be derived from a registered electromagnetic pattern, known location(s) and transmission patterns of the emitters contributing to the SEP registered by this UD. By way of non-limiting example, RTLS 110 can use the locations and transmitting patterns of the identified emitter(s) and the registered RF profile to calculate the accurate location of the respective UD by using any suitable triangulation technique.

In some embodiments, UD location can be obtained from an external source, e.g., by using GPS data. In other embodiments, UD location can be obtained from and external database as, for example, database 121 of LGS 120.

As was detailed with reference to FIG. 1, a user of LGS 120 uses the UD to scan (by its camera) QR code (or other suitable location-indicative code) informative of coordinates (geographical and/or logical) of the location of the QR code source and to send the code to LGS 120. This QR code is communicated to the LGS 120 along with a timestamp and data informative of ID of the reporting UD ($ID_{UD}$). The LGS 120 continuously processes the received data to derive locations of the reporting UDs at the time of reporting and stores the resulting data in database 121. It is noted that at least part of UDs reporting "event reports" to LGS 120 also report "UD reports" to RTLS 110.

As mentioned above with reference to FIG. 1, a reported SEP is referred to hereinafter as a distinct SEP when the UD that has reported the SEP is locatable at the corresponding point-in-time. Thus, UDs with locations determined by LGS 120 and accessible by RTLS 110 are locatable, and the SEPs registered by such UDs can be considered as distinct SEPs.

Once the location of the reporting UDs is determined, RTLS associates (302) each distinct SEP with a location corresponding to the determined location of the respectively reported UD and a timestamp of the report. RTLS further adds (303) data informative of the created associations to a dynamic database configured to maintain records (or other data structures) each informative of association, at a respective point-in-time, between the SEP and its location in the indoor environment.

A record in the dynamic data base can include the coordinates, the SEP registered at these coordinates (including IDs of all emitters ($ID_{EM}$) contributed to the SEP) and the timestamp of the report. The coordinates can be informative of logical location e.g., (building, room, floor number or any other unique ID thereof) or can be physical coordinates which may be expressed in local, or global (X, Y) coordinate terms defined with a certain accuracy. In some embodiments, the coordinates can further include a Z coordinate representing a height, for example associated with a certain floor within a multi-floor indoor environment, and thus expressed in (X, Y, Z) coordinate terms. The accuracy of physical coordinates of the defined location can depend on the source of locating (e.g. triangulation based on the contributing emitters, GPS, external database, etc.).

RTLS 110 further uses the dynamic database to generate (304) one or more SEP maps corresponding to certain point(s)-in-time.

Figure 4B:
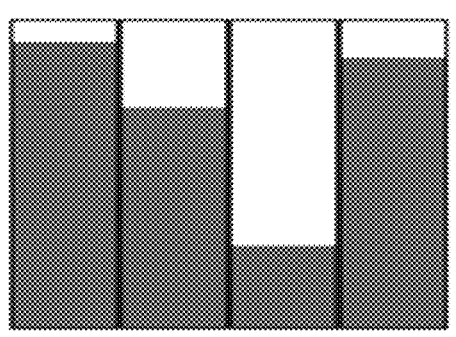
FIGS. 4A and 4B illustrate exemplified RF profiles of registered SEPs.
Figure 4A:
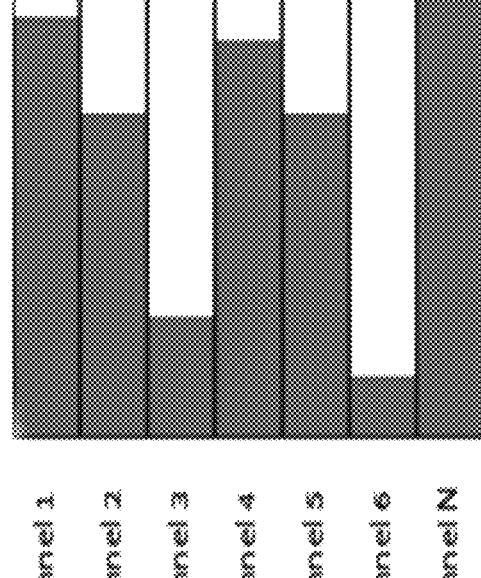

It is noted that a SEP map is a data structure representing data in the dynamic database for a certain point-in-time. Accordingly, the terms "using the SEP map", "searching the SEP map" or alike are, likewise, refer to providing the respective operations with the dynamic database over records corresponding to the point-in-time of interest. Each SEP can be characterized by strength/intensity profile (Received Signal Strength Indicator (RSSI) values) associated with one or more emitters contributed thereto. In this connection, reference is made to FIGS. 4A and 4B, graphically exemplifying Signal Strength Indicator (RSSI) values (RF profiles) of SEPs in the indoor environment. In particular, FIG. 4A is a graphical illustration of an exemplified RF profile with RSSI values registered in a plurality of channels 1, 2, 3, . . . , N, each channel corresponding to an emitter in the vicinity of the certain UD. FIG. 4B graphically illustrates another exemplified RF profile with RSSI values corresponding to two Wi-Fi access points and two BLE tags in the vicinity of a certain UD.

Two SEPs are referred to as substantially the same when they are resulted from contribution of the same emitters and when a discrepancy between their RF profiles meets predefined criteria. The predefined criteria can depend on a required location accuracy, types of emitters contributing to the SEPs, etc. By way of non-limiting example, the discrepancy between the RF profiles can be defined with the help of Tanimoto similarity algorithm or other suitable techniques of similarity measures. Non-limiting example of such technique is described in the article "Comprehensive analysis of distance and similarity measures for Wi-Fi fingerprinting indoor positioning systems" by Joaquin Torres-Sospedra et. al., Expert Systems with Applications, Volume 42, Issue 23, 15 Dec. 2015, Pages 9263-9278. The article is incorporated herein by reference.

Upon receiving an ambiguous SEP, RTLS 110 can search the SEP map for substantially the same SEP with known location, and defines the location of the ambiguous SEP as corresponding to this know location and location of the UD reported the ambiguous SEP as corresponding to location of UD reported the substantially the same distinct SEP.

Figure 5A:
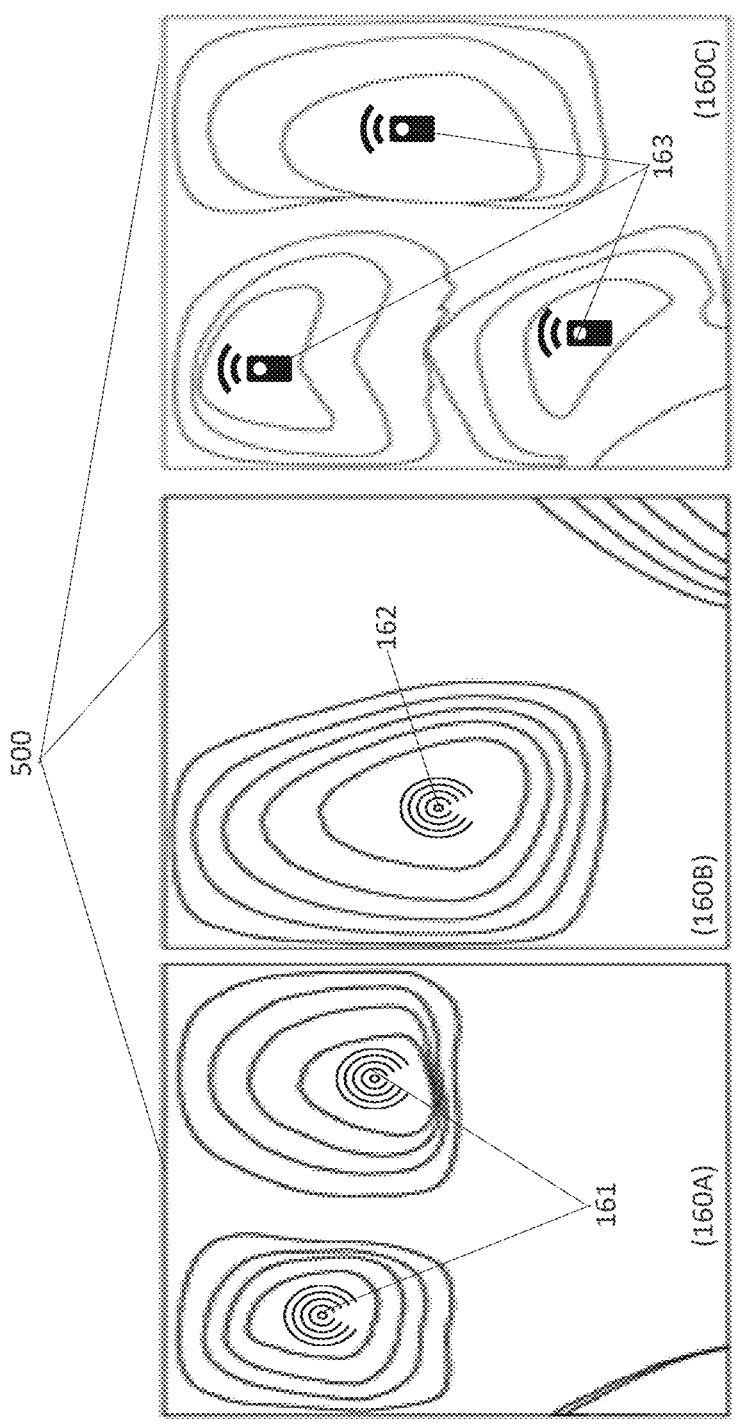
FIGS. 5A and 5B illustrate exemplified emission maps of an indoor environment in accordance with certain embodiments of the presently disclosed subject matter.
Figure 5B:
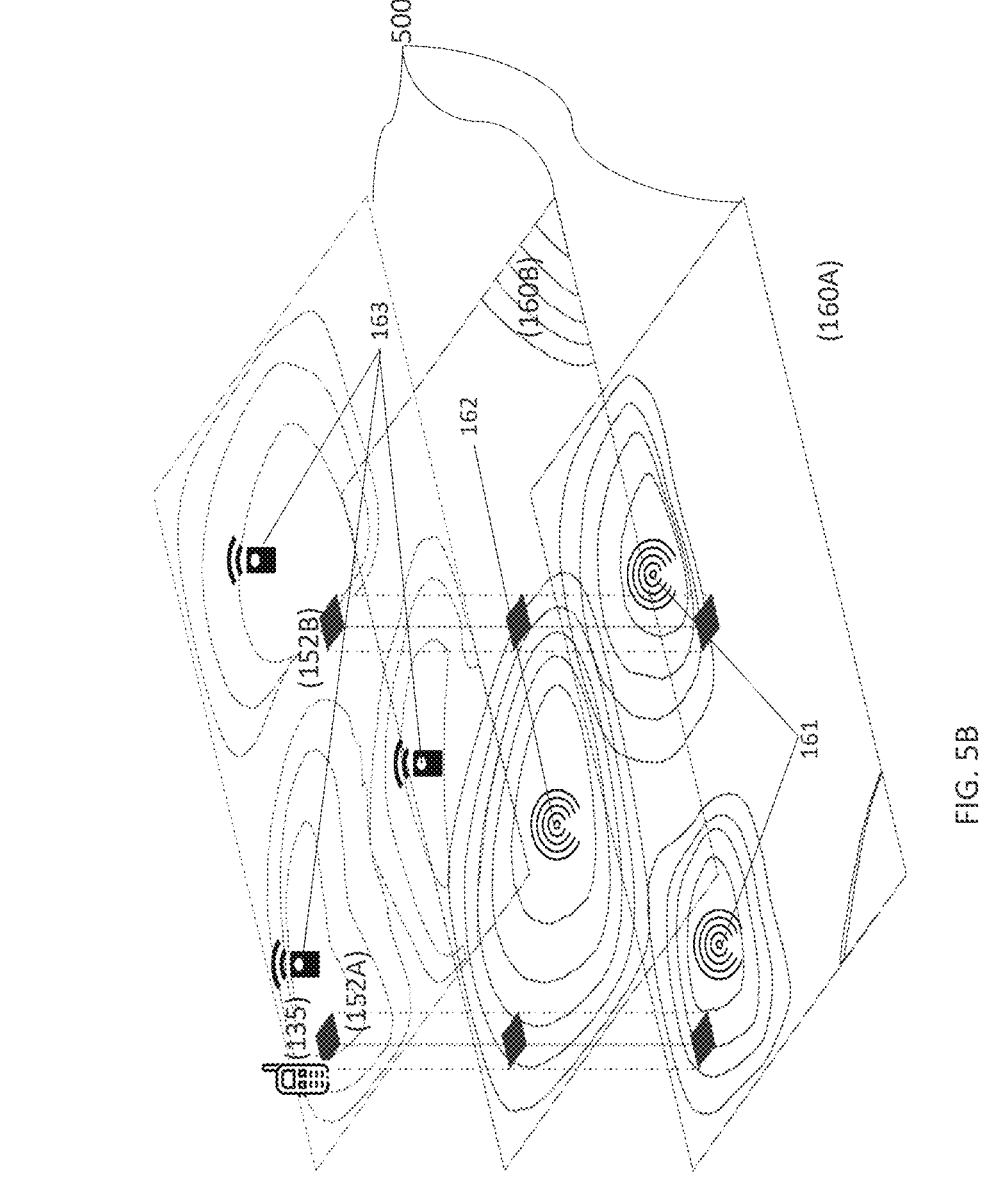

By a way of a non-limiting example the dynamic map can be represented by one or more emission maps. Each emission map is informative of electromagnetic pattern(s) of one or more emitter(s) of the same transmission protocol. In this connection reference is made to FIGS. 5A and 5B, illustrating three emission maps 160A, 160B, and 160C in the indoor environment 500 in accordance with certain embodiments of the presently disclosed subject matter. In particular, emission map 160A includes two emitters 161 which can be, for example, Wi-Fi access points. Emission map 160B includes one emitter 162 which can be, for example, BLE beacon points. Likewise, emission map 160C includes three emitters 163 which can be, for example, Bluetooth tags.

As can be seen in FIG. 5B, UD 135, which is located in the indoor environment 500, relays to the RTLS a time-stamped "object report" informative of a unique identification of a tagged objects ($ID_{TO}$) registered by the UD 135 in its proximity, of a unique identification of the given UD ($ID_{UD}$) and of ambiguous SEP registered by the given UD. As described above with reference to FIG. 1, the ambiguous SEP is informative of registered strength/intensity profile and IDs of emitters ($ID_{EM}$) contributing thereto, namely, from all the all the emitters in the area 500. At this stage, the RTLS can determine the coordinates of UD 135, by associating/matching the ambiguous SEP registered by UD 135 to the possible location(s) on the emissions maps 160A.

As shown in FIG. 5B, in some cases, a given UD can register an ambiguous SEP which can be associated with more than one location on the dynamic map (represented by the emissions maps 160A, 160B, and 160C). In particular, locations 152A and 152B can correspond to the same ambiguous SEP. In this case, in such cases only an estimated location UD 135 can be provided, e.g., a location somewhere between locations 152A and 152B. In some embodiments, the RTLS can use RSSI values of the one or more emitters contributing to ambiguous SEP over time to enhance accuracy of the location of the UD 135.

Figure 6:
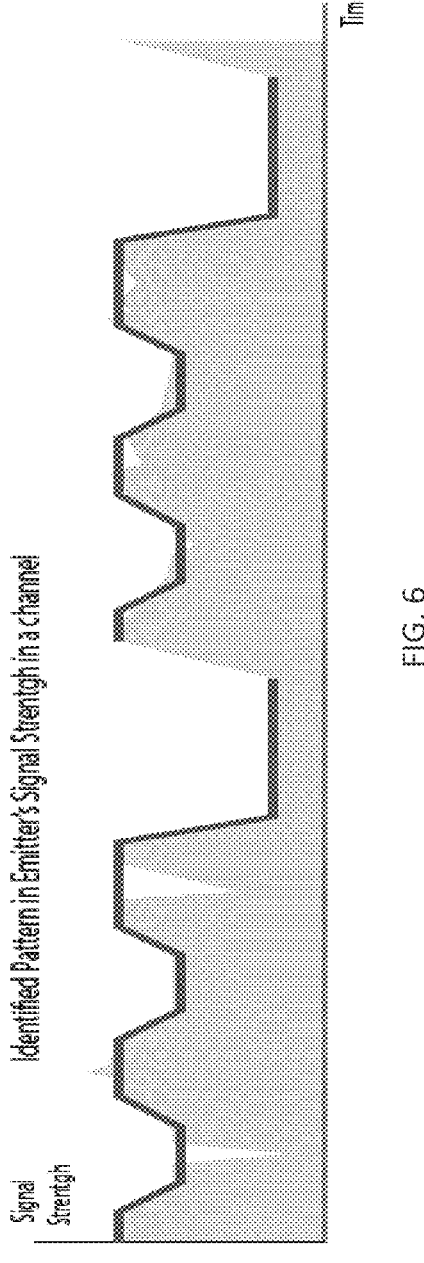
FIG. 6 illustrates exemplified changes over time of a transmission pattern of a given emitter.

FIG. 6 graphically illustrates signal strength/intensity (RSSI) associated with a certain emitter or a tagged object over time sampled by a given UD 135 in the area 150A.

Figure 7:
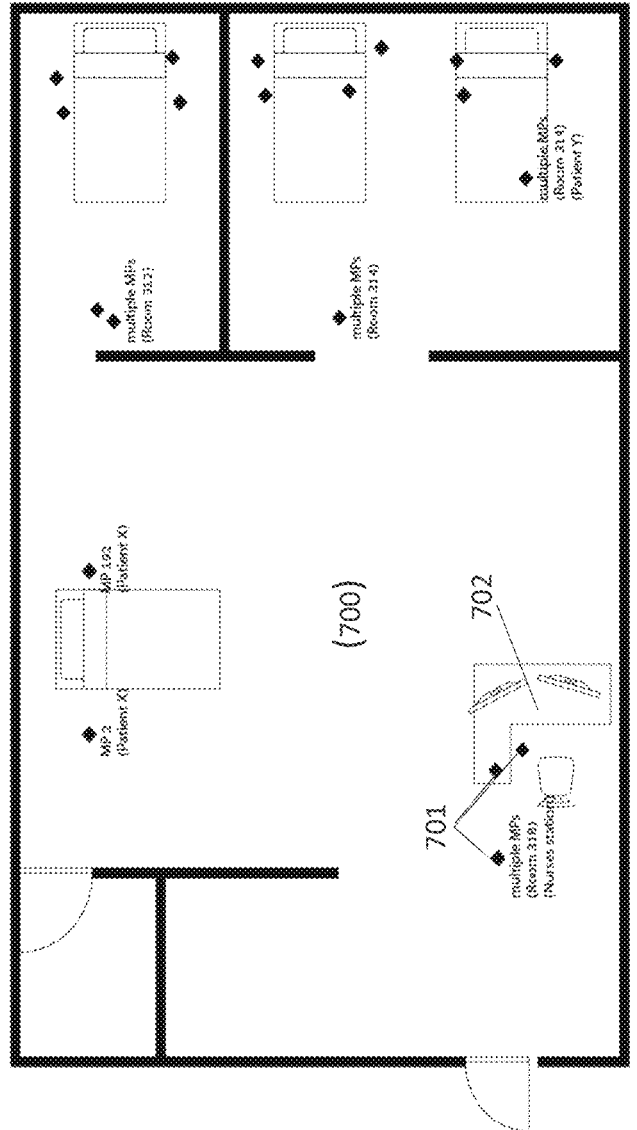
FIG. 7 illustrates an indoor environment served by the RTLS and a logistic system (LGS) in accordance with certain embodiments of the presently disclosed subject matter.

Referring now to FIG. 7 illustrating an indoor environment 700, in this example a medical facility, served by the RTLS 110 and a logistic system (LGS) 120 in accordance with certain embodiments of the presently disclosed subject matter. As can be seen, the medical facility can have one or more rooms arranged on one or more floors of the facility (only one floor is shown herein). Typically, such medical facility can include medical equipment such as patient beds disposed in various rooms and other types of stationary and/or non-stationary equipment such as a PC located at a nursing station.

Users of user devices (UDs) perform their routine tasks in the medical facility. For example, cleaning the Restroom on floor 2 room 5, or a technician should fix a machine on level 1 room 7. The users use the camera of their UD to scan a specific QR code. Such QR code may be located near the door of a certain room or floor or on the equipment initially tagged by the facility staff. This procedure includes providing event reports to the LGS 120. Such "event report" includes a timestamp and data informative of ID of the reporting UD ($ID_{UD}$) in association with the reported location-indicative code (QR code). Most of those routine tasks require physical proximity to specific equipment with a known logical location.

At each area indoor environment 700 UDs continuously provide UD reports to the RTLS 110 from different proximal locations in the respective area. For example, three UD reports 701 at a nursing station 702. RTLS uses the UD reports to generate the dynamic map of the indoor environment 700.

Figure 8A:
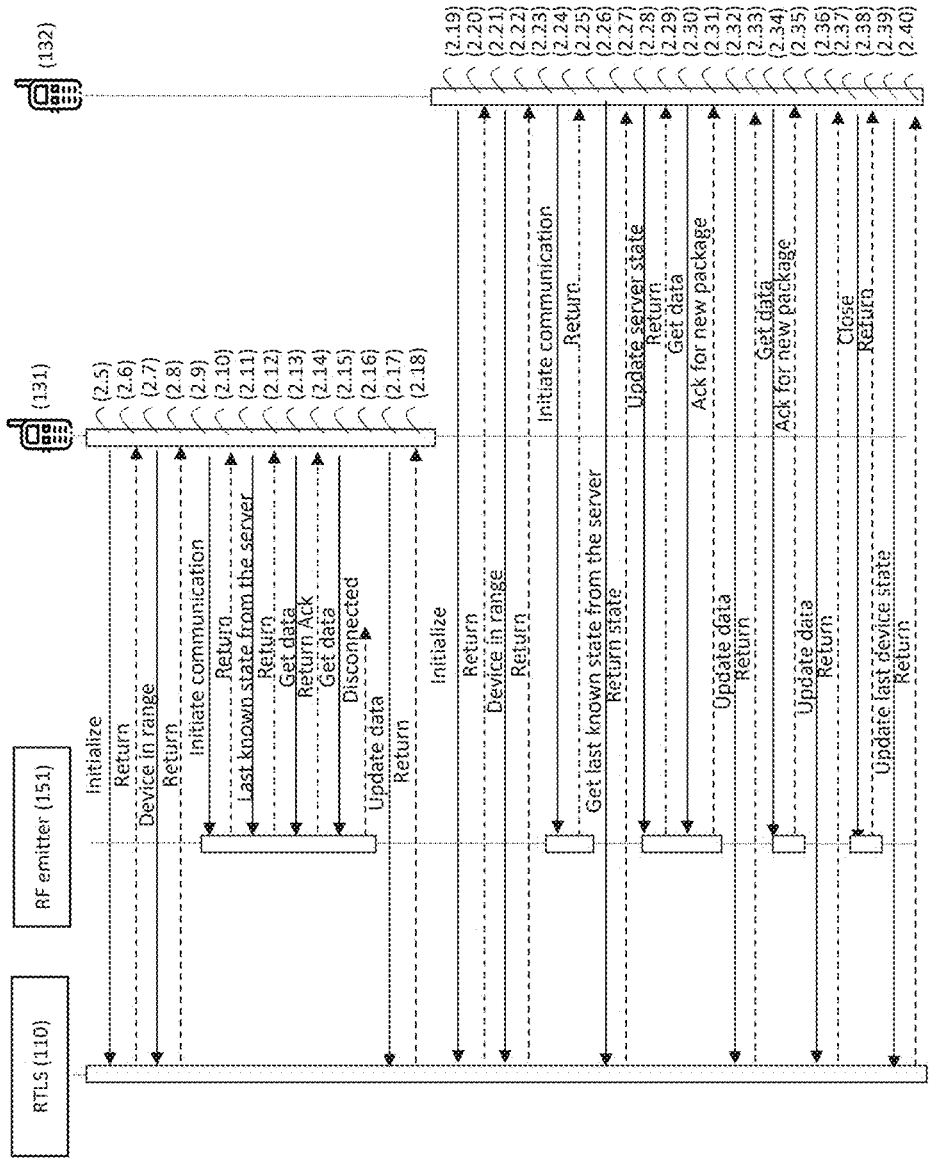
FIGS. 8A and 8B illustrate exemplary communication protocols between several UDs, RTLS and an emitter in accordance with certain embodiments of the presently disclosed subject matter.
Figure 8B:
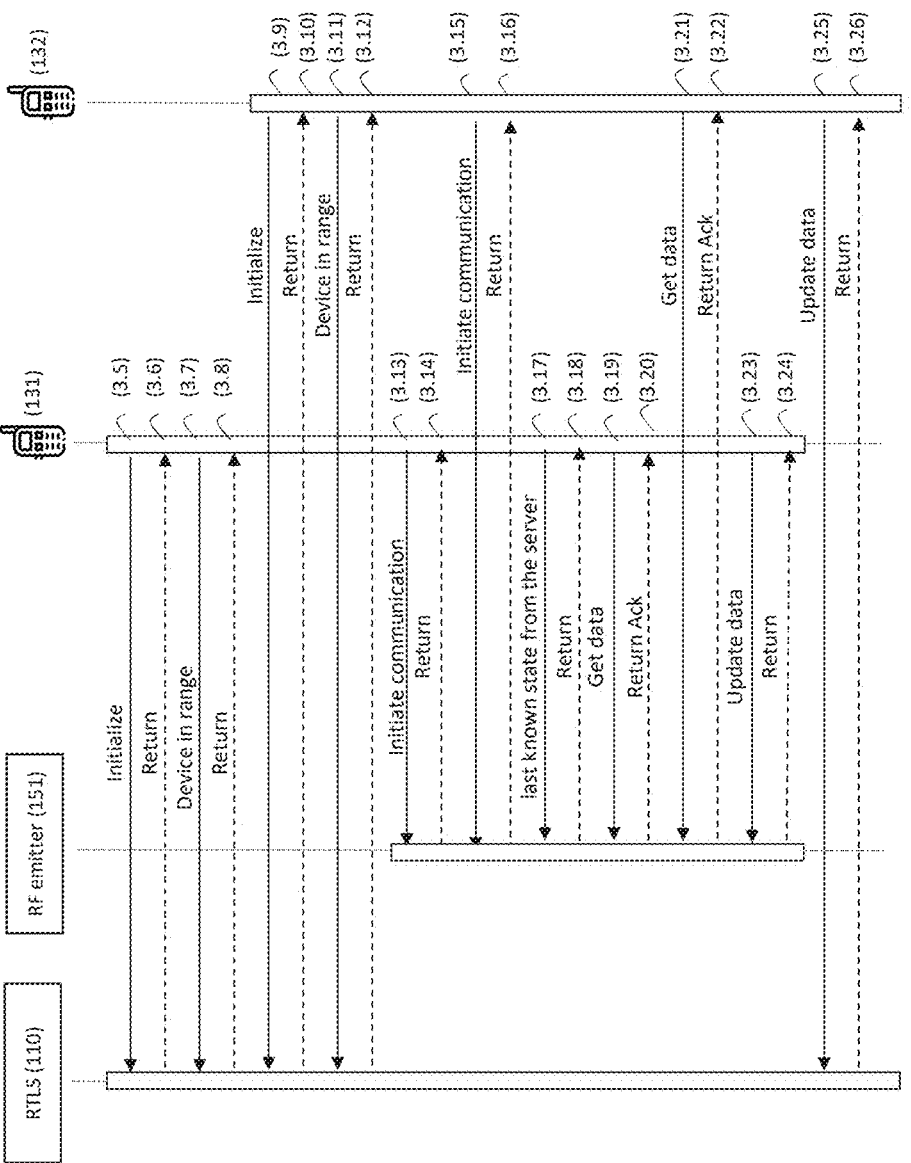

Referring now to FIGS. 8A and 8B illustrating few communication protocols between several UDs, the RTLS 110 and one or more emitters in the vicinity of the UDs in accordance with certain embodiments of the presently disclosed subject matter. To facilitate understanding, communication protocol with only one RF emitter 151 is shown in FIGS. 8A and 8B.

FIG. 8A illustrates a communication protocol of two user devices (UDs) 131 and 132 being in communication range with one or more emitters successively or with a certain time interval. Initially, only UD 131 is in communication range with the RF emitter 151 while the UD 131 is not yet in range. When UD 131 detects that there is RF emitter 151 is in range, it connects to the RTLS 110 to get information about the RF emitter 151 (2.5-2.8). When the RTLS 110 responds (2.8) it provides the last known communication state of each smart the RF emitter 151 (or any other RF emitter that is in range) as sent by the UD 131 (2.7).

The UD 131 initiates communication (2.9) with RF emitter 151, receives from the RTLS 110 the last known state of the RF emitter 151 an provides this last known state of the RF emitter 15 (2.11) thereto. The UD 131 can then request to get further data regarding the last known state (2.13) of the RF emitter 151. Generally, The UD 131 can continuously request more state data until there is no more data or a sudden communication drop (2.16). Such communication drop of the UD 131 can occur with no notice because of an unknown reason such as getting out of reception range or the user closes the application, or the device is powered off or any other reason for that matter.

Then, the UD 131 updates the RTLS 110 (2.17-2.18) with the last data it received from the RF emitter 151 and this is registered by the RTLS 110 as the last known state. At some point in time another device UD 132 can be in communication range with the RF emitter 151. Accordingly, when the UD 132 is in range with the RF emitter 151, the communication continues from the last kwon state RF emitter 151. More specifically, The UD 132 initiates the communication with the RTLS 110 (2.19-2.22) and provides data informative of one or more devices that are in range (2.21).

The UD 132 then initiates the communication with the RF emitter 151 (2.23-2.24) and requests the server for data about the last known state of the RF emitter 151 (2.25-2.26), update the RF emitter 151 with the last known state that the registered by the RTLS 110 (2.27-2.28) and possibly with additional information registered by the RTLS 110 regarding the RF emitter 151 (for example, configuration information).

The UD 132 resumes the communication with the RF emitter 151 from the last known state and continues to receive data (2.29-2.30) from the RF emitter 151 and to update the RTLS 110 (2.31-2.32). The UD 132 updates the RF emitter 151 with an ACK message (2.33-2.34) anytime the UD 132 receives the data therefrom, so the RF emitter 151 can know not to resend this data to the UD 132. When there is no more information, or when the system knows that the user is going to quit the application, a graceful close message can be sent to the device (2.39) and to the RTLS 110 (2.40).

FIG. 8B illustrates a communication protocol of two user devices (UDs) 131 and 132 being in communication range with the RF emitter 151 concurrently. In this diagram user devices (UDs) 131 and 132 are both simultaneously in communication range of the RF emitter 151. This enables to have more than one communication channel with the RTLS 110 at the same time. UD 131 and initiates communication with the RTLS 110 (3.5-3.8) as well as UD 132 (3.9-3.12). In this example The UDs 131 and 132 communicate with the RF emitter 151 one after the other however other possibilities such as when their communication overlapping one with the other are also contemplated. The RF emitter 151 can know that it is in communication with many UDs, so the RF emitter 151 can split the communication between all channels of the UDs in range.

It should be noted that all the user devices participate in a single communication session between the RTLS 110 and the RF emitter 151. Each such communication session can have unique session identifier. The RF emitter 151 obtains the state identifier from the RTLS 110 via the UDs 131 (3.17), such that the RF emitter 151 uses the state identifier to update the RTLS 110 through both UDs 131 and 132. The advantage is that the communication continues as long as there are any mobile devices in range, and the bandwidth can be significantly wider multiple user devices are in communication range.

Figure 9:
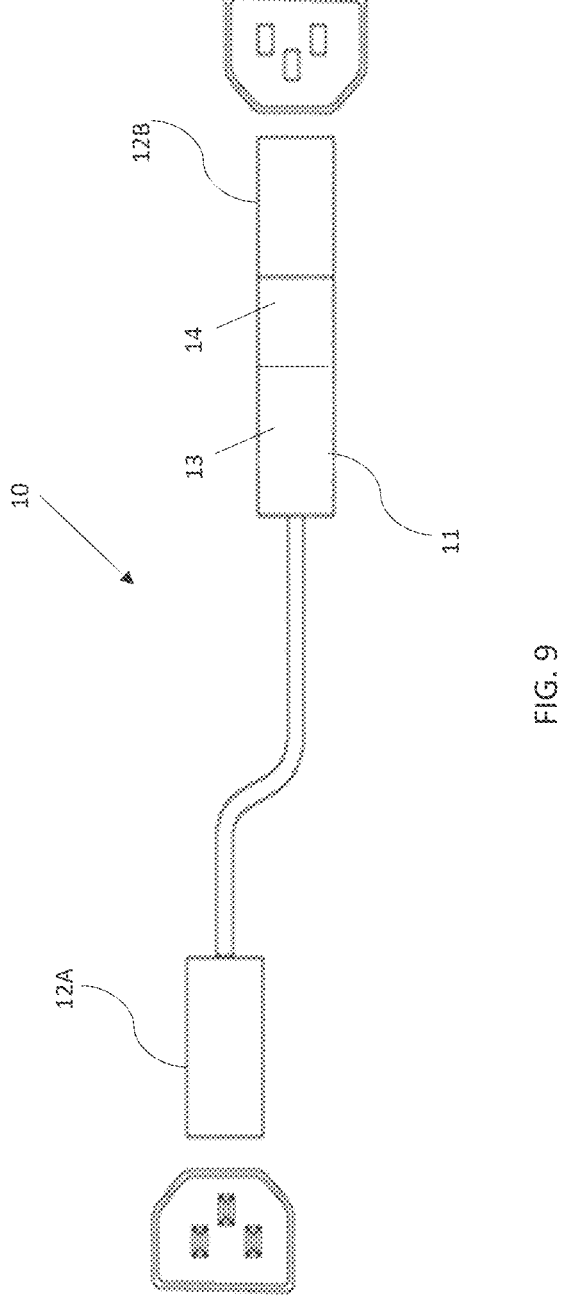
FIG. 9 illustrates a smart feeding cable in accordance with certain embodiments of the presently disclosed subject matter.

Referring now to FIG. 9, illustrating a smart feeding cable 10 in accordance with certain embodiments of the presently disclosed subject matter. The cable 10 is configured as a bi-functional cable that can serve simultaneously as an RF emitter and as feeding cable for an electronic device of interest. Such cables can, for example, be used as ID tags that can be connectable to objects of interest. The cable has electronic utility 11 electrically coupled to the cable 10. The electronic utility 11 can include an RF radiating unit 13 (e.g., BLE, Wi-Fi) configured to emit RF radiation and a processing unit 14 configured for determining the cable's operational status. Operational status of the cable can be indicative, for example, of operation times, charging times, and/or state of the cable (plugged or unplugged to the electric source or to the electronic device).

The RF radiating unit 13 and the processing unit 14 are powered/fed by one or more rechargeable batteries (not shown) that are charged by means of electrical inductance, capacitance etc. when the cable 10 is plugged to a power source. Accordingly, when the cable 10 is in its unplugged state the electronic utility 11 continues to operate and the cable emits RF radiation. Thus, the cable can communicate the operational status data to the RTLS or to one or more of the UDs. This data can, in turn, be used to monitor the device it is associated with, make sure it is not disconnected from the device, such that whenever the cable 10 is disconnected from the device it can broadcast a warning signal.

The feeding cable has a male connector 12A at one end thereof for connecting to a power source and a female connector 12B at an opposite end thereof for connecting to an electronic device of interest. The cable's identity can be registered by the RTLS server so that when a client (user device) receives its transmitted signals it can be used to determine its relative locations, enabling RTLS to determine the location of the device connected to/being fed by the smart cable 10. The BLE beacon in the smart cable will also transmit its measurement positions, operation times, charging times, or regardless of if the cable 10 is connected to the power source or not.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of real-time locating an object in an indoor environment, the method comprising:

obtaining, by a computer, from a given user device (UD) a timestamped UD report informative of a unique identification of a given tagged object registered by the given UD in its proximity, of a unique identification of the given UD ($ID_{UD}$) and of an ambiguous sample electromagnetic pattern (SEP) registered by the given UD at a given point-in-time corresponding to a timestamp of the given UD report; and defining, by the computer, a location of the given tagged object at the given point-in-time in accordance with the location of the given UD, wherein the location of the given UD is defined using a mapping data structure comprising a plurality of SEP maps corresponding to different points-in-time, each SEP map being informative of associations between distinct SEPs registered at a respective point-in-time and locations of those SEPs at that point-in-time, and wherein defining the location of the given UD at the given point-in-time comprises:

searching the mapping data structure to select a SEP map corresponding to the given point-in-time and to detect in the selected SEP map a distinct SEP that, at the given point-in-time, is substantially the same as the ambiguous SEP reported by the given UD, thus giving rise to a detected substantially the same distinct SEP; and defining the location of the ambiguous SEP at the given point-in-time as corresponding to a known location of the detected substantially the same distinct SEP, thereby defining a location of the given UD at the given point-in-time as corresponding to the known location of the detected substantially the same distinct SEP.

2. The method of claim 1, wherein a UD report is informative of one or more stationary emitters having known locations and transmission patterns and contributed to a reported distinct SEP, the method further comprising deriving a UD location from the known emitters' locations; and using the derived UD location when generating the mapping data structure.

3. The method of claim 1 further comprising using, by the computer, the $ID_{UD}$ from a UD report and the report's timestamp to obtain a location of the reported UD from an external database informative of an association of the reported UD and its location at a respective point-in-time; and using the obtained UD location when generating the mapping data structure.

4. The method of claim 3, wherein the external database is a database of a logistics system configured to store timestamped event reports, each report comprising data informative of ID of the reporting UD in association with a reported location-indicative code; and wherein at least part of UDs sending the event reports belong to the first plurality of UDs.

5. The method of claim 1, further comprising:

continuously maintaining a database comprising a plurality of SEP maps, each associated with a respective point-in-time;

continuously receiving timestamped UD reports from a plurality of UDs and storing at least part of the received timestamped UD reports;

upon defining one or more points-in-time of interest, selecting one or more mapping data structures and one or more timestamped UD reports corresponding to the defined points-in-time of interest; and using the selected one or more SEP maps and one or more timestamped UD reports to define the object location at the defined points-in-time of interest, thereby enabling back and/or forth temporal tracking the location of the tagged object.

6. The method of claim 5, further comprising:

continuously determining locations of UDs from the first plurality of UDs;

continuously associating the determined locations of the UDs with respectively reported SEPs and timestamps of the respective reports to yield a plurality of SEP maps informative of SEP locations at respective points-in-time;

continuously adding the SEP maps to a database configured to maintain data informative of SEPs and association, at a respective point-in-time, between the SEPs and their locations in the indoor environment; and using the database to generate one or more SEP maps corresponding to one or more points-in-time of interest.

7. A real-time locating system (RTLS) to locate an object in an indoor environment, the system comprising a computer configured to:

obtain from a given user device (UD) a first timestamped UD report informative of a unique identification of a given tagged object registered by the given UD in its proximity, of a unique identification of the given UD ($ID_{UD}$) and of ambiguous sample electromagnetic pattern (SEP) registered by the given UD at a given point-in-time corresponding to a timestamp of the given UD report; and define a location of the given tagged object at the given point-in-time in accordance with the location of the given UD wherein the location of the given UD is defined using a mapping data structure comprising a plurality of SEP maps corresponding to different points-in-time, each SEP map being informative of associations between distinct SEPs registered at a respective point-in-time and locations of those SEPs at that point-in-time, and wherein defining the location of the given UD at the given point-in-time comprises:

searching the mapping data structure to select a SEP map corresponding to the given point-in-time and to detect in the selected SEP map a distinct SEP that, at the given point-in-time, is substantially the same as the ambiguous SEP reported by the given UD, thus giving rise to a detected substantially the same distinct SEP; and defining the location of the ambiguous SEP at the given point-in-time as corresponding to a known location of the detected substantially the same distinct SEP, thereby defining a location of the given UD at the given point-in-time as corresponding to the known location of the detected substantially the same distinct SEP.

8. The system of claim 7, wherein a UD report is informative of one or more stationary emitters having known locations and transmission patterns and contributed to a reported distinct SEP, the method further comprising deriving a UD location from the known emitters' locations; and using the derived UD location when generating the mapping data structure.

9. The system of claim 7, wherein the computer is further configured to use the IDup from a "UD report" and the report's timestamp to obtain a location of the reported UD from an external database informative of an association of the reported UD and its location at a respective point-in-time; and using the obtained UD location when generating the mapping data structure.

10. The system of claim 9, wherein the external database is a database of a logistics system configured to store timestamped event reports, each report comprising data informative of ID of the reporting UD in association with a reported location-indicative code; and wherein at least part of UDs sending the event reports belong to the first plurality of UDs.

11. The system of claim 7, wherein the computer is further configured to:

continuously maintain a database comprising a plurality of SEP maps, each associated with a respective point-in-time;

continuously receive timestamped UD reports from a plurality of UDs and store at least part of the received UD reports;

upon defining one or more points-in-time of interest, select one or more mapping data structures and one or more timestamped UD reports corresponding to the defined points-in-time of interest; and use the selected one or more SEP maps and one or more timestamped UD reports to define the object location at the defined points-in-time of interest, thereby enabling back and/or forth temporal tracking the location of the tagged object.

12. The system of claim 11, wherein the computer is further configured to:

continuously determine locations of UDs from the first plurality of UDs;

continuously associate the determined locations of the UDs with respectively reported SEPs and timestamps of the respective reports to yield a plurality of SEP maps informative of SEP locations at respective points-in-time;

continuously add the SEP maps to a database configured to maintain data informative of SEPs and association, at a respective point-in-time, between the SEPs and their locations in the indoor environment; and use the database to generate one or more SEP maps corresponding to one or more points-in-time of interest.

13. A non-transitory computer-readable medium comprising instructions that, when executed by a computer comprising a memory storing a plurality of program components executable by the computer, cause the computer to enable a real-time locating an object in an indoor environment, comprising:

obtaining from a given user device (UD) a UD report informative of a unique identification of a given tagged object registered by the given UD in its proximity, of a unique identification of the given UD ($ID_{UD}$) and of an ambiguous sample electromagnetic pattern (SEP) registered by the given UD at a given point-in-time corresponding to a timestamp of the given UD report; and defining a location of the given tagged object at the given point-in-time in accordance with the location of the given UD, wherein the location of the given UD is defined using a mapping data structure comprising a plurality of SEP maps corresponding to different points-in-time, each SEP map being informative of associations between distinct SEPs registered at respective point-in-time and locations of those SEPs at that point-in-time; and wherein defining the location of the given UD at the given point-in-time comprises:

searching the mapping data structure to select a SEP map corresponding to the given point-in-time and to detect in the selected SEP map a distinct SEP that, at the given point-in-time, is substantially the same as the ambiguous SEP reported by the given UD, thus giving rise to a detected substantially the same distinct SEP; and defining the location of the ambiguous SEP at the given point-in-time as corresponding to a known location of the detected substantially the same distinct SEP, thereby defining a location of the given UD at the given point-in-time as corresponding to the known location of the detected substantially the same distinct SEP.

14. The computer-readable medium of claim 13, wherein a UD report is informative of one or more stationary emitters having known locations and transmission patterns and contributed to a reported distinct SEP, the method further comprising deriving a UD location from the known emitters' locations; and using the derived UD location when generating the mapping data structure.

15. The computer-readable medium of claim 13, wherein the locating further comprises using the $ID_{UD}$ from a UD report and the report's timestamp to obtain a location of the reported UD from an external database informative of an association of the reported UD and its location at a respective point-in-time; and using the obtained UD location when generating the mapping data structure.

16. The computer-readable medium of claim 13, wherein the locating further comprises:

continuously maintaining a database comprising a plurality of SEP maps, each associated with a respective point-in-time;

continuously receiving timestamped UD reports from a plurality of UDs and storing at least part of the received first timestamped UD reports;

upon defining one or more points-in-time of interest, selecting one or more SEP maps and one or more timestamped UD reports corresponding to the defined points-in-time of interest; and using the selected one or more SEP maps and one or more timestamped UD reports to define the object location at the defined points-in-time of interest, thereby enabling back and/or forth temporal tracking the location of the tagged object.

17. The computer-readable medium of claim 16, wherein the locating further comprises:

continuously determining locations of UDs from the first plurality of UDs;

continuously associating the determined locations of the UDs with respectively reported SEPs and timestamps of the respective reports to yield a plurality of SEP maps informative of SEP locations at respective points-in-time;

continuously adding the SEP maps to a database configured to maintain data informative of SEPs and association, at a respective point-in-time, between the SEPs and their locations in the indoor environment; and using the database to generate one or more SEP maps corresponding to one or more points-in-time of interest.

* * * * *